June 28, 1955  R. B. HOWELL  2,711,636
CHILD'S DISH
Filed Aug. 16, 1950  3 Sheets-Sheet 1
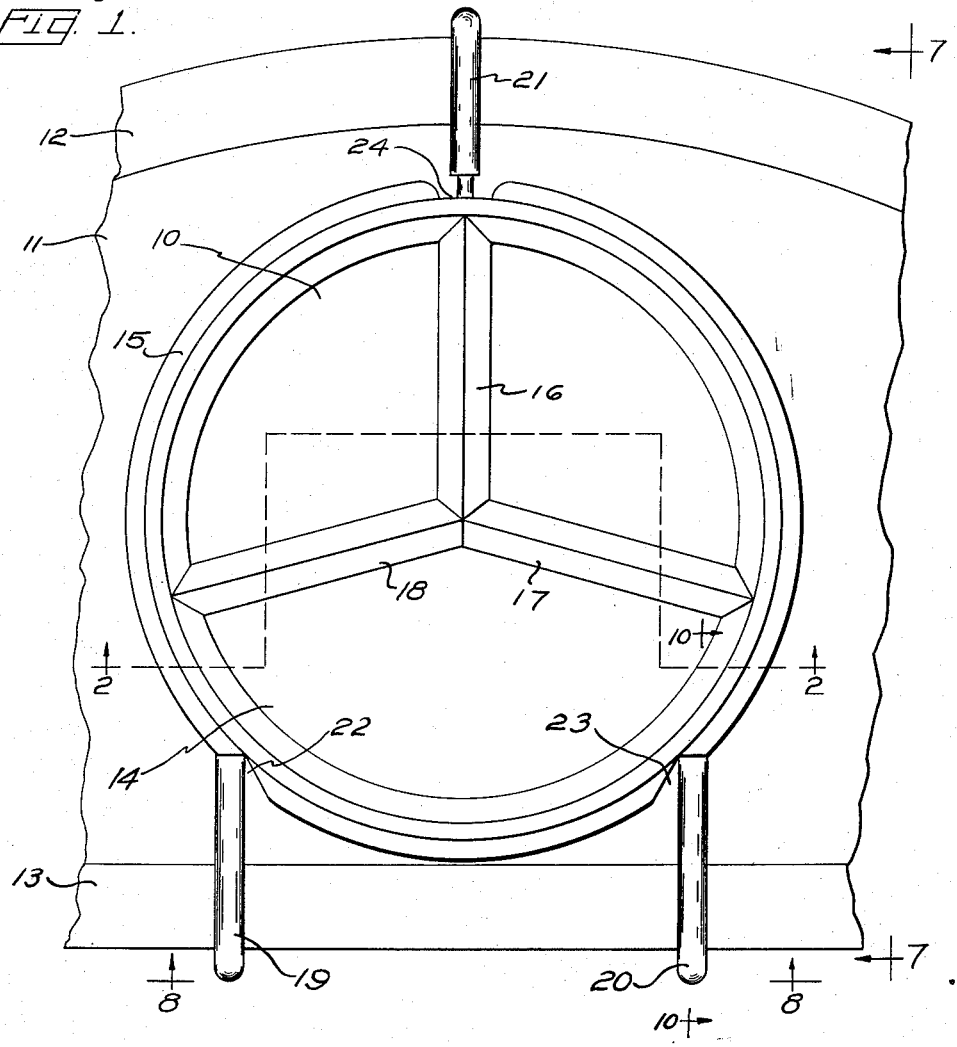
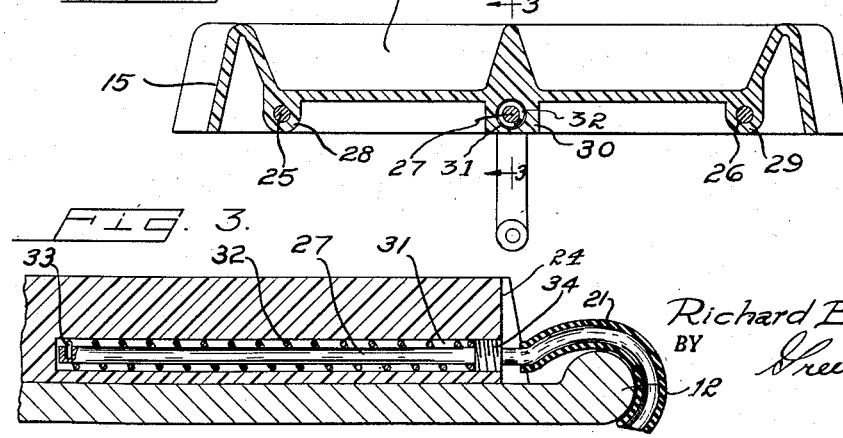
INVENTOR.
Richard B. Howell
BY
Fresh Wells
Atty.

June 28, 1955  R. B. HOWELL  2,711,636
CHILD'S DISH
Filed Aug. 16, 1950  3 Sheets-Sheet 2
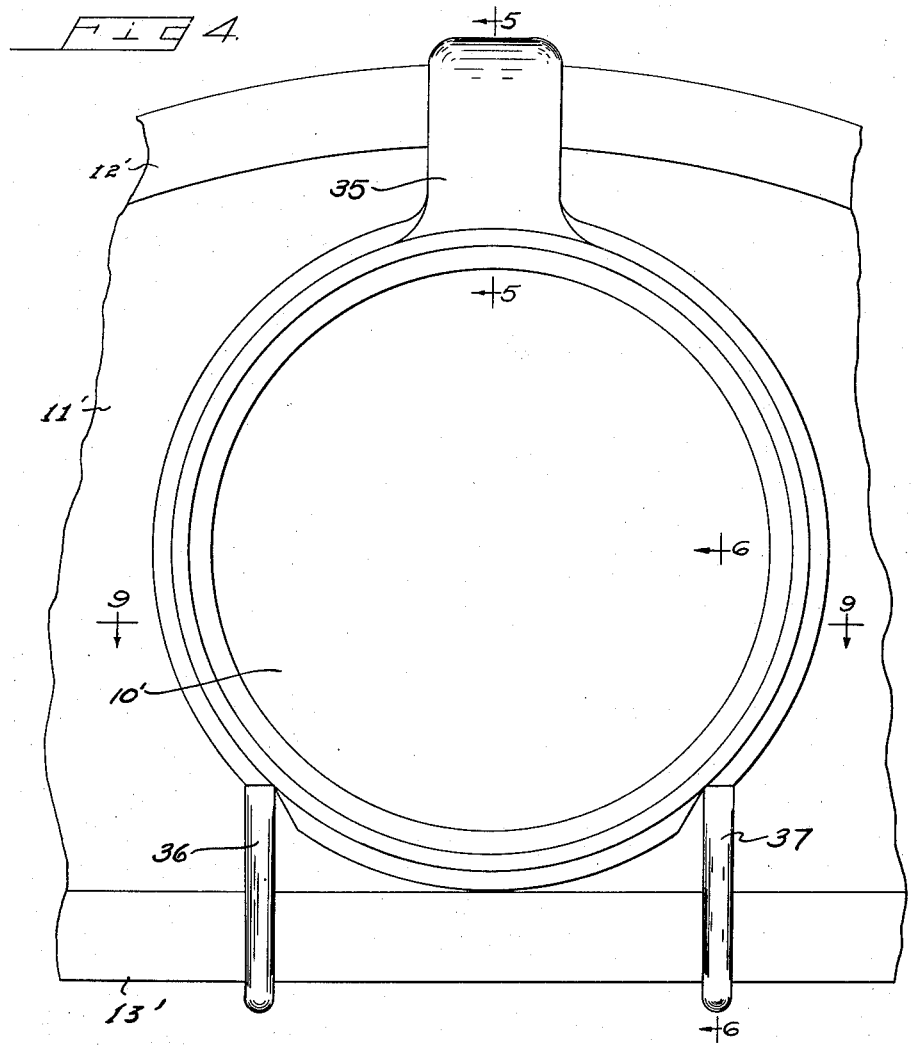
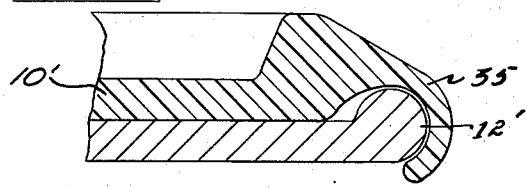
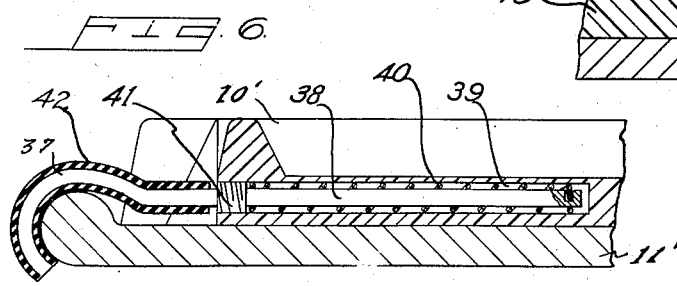
INVENTOR.
Richard B. Howell
BY
Atty.

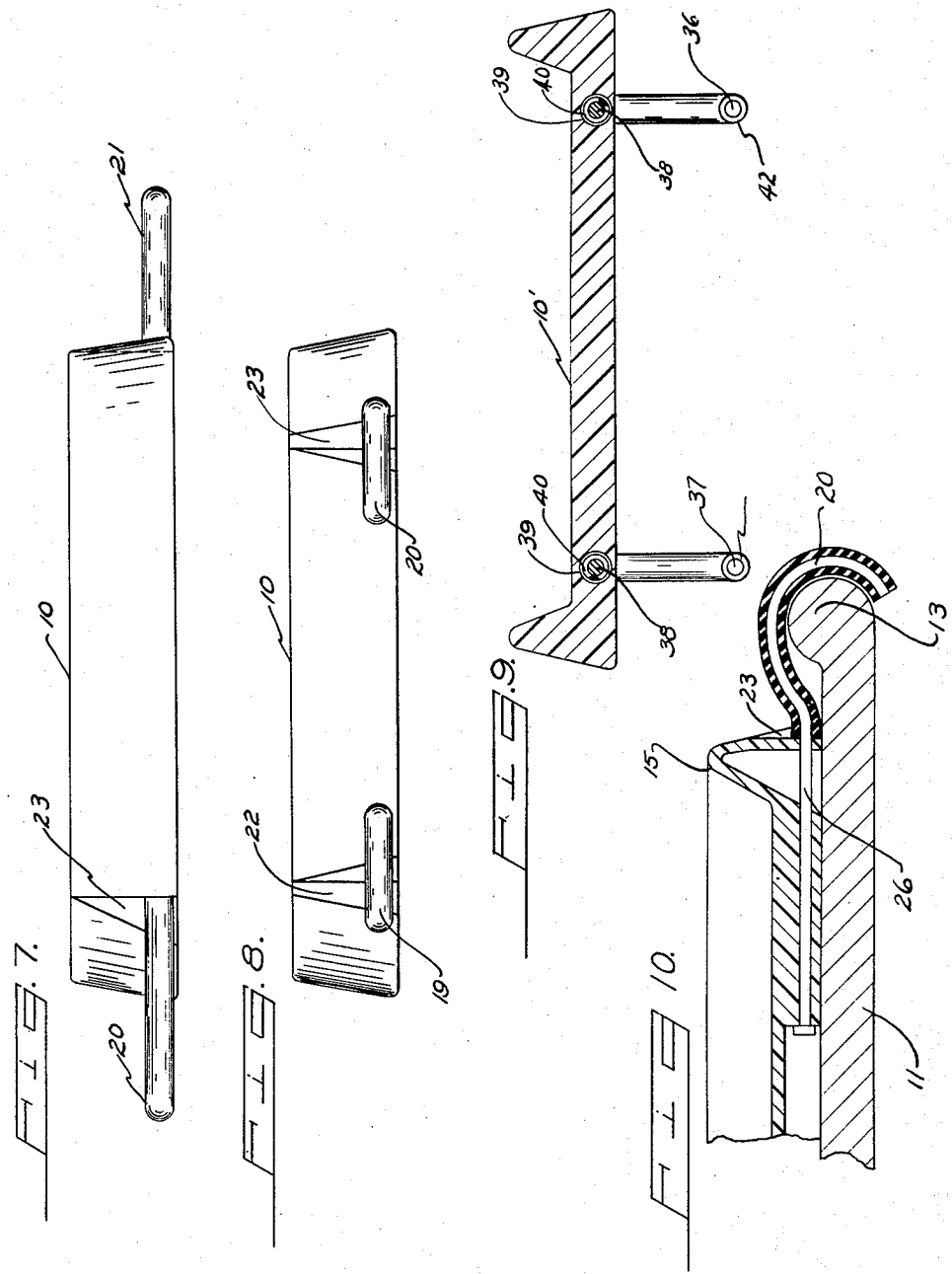

United States Patent Office 2,711,636
Patented June 28, 1955

2,711,636
CHILD'S DISH

Richard B. Howell, Milwaukee, Wis., assignor to The Kendall Corporation, Milwaukee, Wis., a corporation of Wisconsin Application August 16, 1950, Serial No. 179,668

2 Claims. (Cl. 65—54)

The present invention relates to improvements in a child's dish.

In my prior application, Serial No. 92,631, issued as Patent No. 2,666,612 on January 19, 1954, I show and claim a holder for a child's dish that is adapted to secure the dish to a support such as a high chair tray. The present invention is an improvement over the aforesaid device wherein the dish itself is modified to provide means that will secure the dish upon the high chair tray. The modifications of the dish are such that they do not interfere in any way with the use of the dish in the usual manner except that the tray engaging hooks are parts of the dish.

My invention contemplates a child's dish having the usual recessed top surface to receive food and having a rim which is adapted to rest upon a table or tray. The means to secure the dish to a tray so that a child cannot tip the dish or lift it off the tray project from the side edges of the dish and include hooks that extend down over the tray edges. At least one of the hooks must be adjustable and preferably spring pressed toward the dish in order to clamp on the side edge of the tray.

The nature and advantages of my invention will appear more fully from the following description and the accompanying drawings illustrating a preferred form of the invention. It should be understood however, that the drawings and description are illustrative only and should not be considered as limiting the invention except insofar as it is limited by the claims.

In the drawings:

Figure 1 is a plan view of a dish embodying my invention showing the hooks for attaching it to a high chair tray;

Figure 2 is a sectional view on the line 2—2 of Figure 1;

Figure 3 is a fragmentary sectional view on the line 3—3 of Figure 2;

Figure 4 is a plan view similar to Figure 1 illustrating a modification;

Figure 5 is a fragmentary sectional view taken on the line 5—5 of Figure 4;

Figure 6 is a fragmentary sectional view taken on the line 6—6 of Figure 4;

Figure 7 is a side view of the child's dish looking at Figure 1 in the direction indicated by the line 7—7 on Figure 1, but showing the hooks of the dish in storage position;

Figure 8 is a side view of the dish looking at Figure 1 in a direction indicated by the line 8—8 on Figure 1, but showing the hooks in storage position;

Figure 9 is a sectional view taken on the line 9—9 of Figure 4; and

Figure 10 is a fragmentary sectional view on the line 10—10 of Figure 1.

Referring now to the drawings and particularly to Figures 1 to 3 inclusive, my invention is shown in connection with a child's dish 10 which is adapted to be mounted upon a high chair tray 11. It is customary to provide the high chair trays with raised edge portions 12 and 13. The present invention is intended to provide a means for holding the dish 10 to the tray 11 so that a child learning to feed itself cannot pick up the dish or tip it over. Dishes for children vary a great deal in their design and shape. In all cases however, the dishes contain a depressed upper portion 14 for receiving food and an edge portion 15 which faces outwardly. There may be divisions such as indicated at 16, 17, and 18 within the dish for the purpose of segregating different foods.

In order to provide the dish with means to secure it to the high chair tray, I mount a plurality of hooks 19, 20 and 21 so that they project laterally from the edge portion of the dish. These hooks are preferably covered with a resilient material such as rubber. I have shown the edge portion 15 of the dish as recessed at 22 and 23 for the hooks 19 and 20 and as recessed at 24 for the hook 21. Such recesses are refinements and not necessary to the successful operation of the means for securing the dish to the high chair tray. The hooks 19, 20 and 21 are provided with shanks 25, 26 and 27 which extend through the edge 15 of the dish and are secured in the dish below the recess 14. The shanks 25 and 26 are rotatably mounted in beads 28 and 29 that are integral parts of the dish 10. The shank 27 is rotatably and slidably mounted in a bead 30 which is bored to provide a hole 31 somewhat larger in diameter than the shank 27. A coil spring 32 has its end 33 secured in the shank 27 and is held in the hole 31 by a screw plug 34. The spring 32 is under compression so that it tends to push the shank into the hole 31 to cause the hook 21 to grip the side edge of a tray. It is evident from an inspection of Figures 7 and 8 that the hooks 19, 20 and 21, since they are all rotatable in the dish, may be turned to lie substantially in the plane of the dish whenever the dish is stored. They are easily kept clean and provide a simple and effective means for preventing the child from tipping over the dish or throwing it off the high chair. It is obvious of course, that the design and style of the child's dish may be varied greatly without departing in any way from the present invention, the essential elements of which comprise oppositely directed hooks extending away from the edge portion of the dish with at least one of the hooks being movable toward and away from the dish to engage a high chair tray. Provision of shanks on the hooks so that they may be rotated with respect to the dish makes it more convenient to store with the bottom surface resting on a shelf. It also makes the dish usable on a table.

Referring now to Figures 4, 5 and 6, in this form of the invention the same basic arrangement of hooks is provided for the dish 10'. In this case however, one hook 35 is formed integral with the dish. Two opposite hooks 36 and 37 are provided and both these hooks have shanks such as 38 (see Figure 6) which extend into holes 39 that are formed in the lower portion of the dish 10'. Springs 40 are secured to the shanks 38 and are held under compression by plugs 41 at the outer ends of the holes 39. The extended portions of the hooks 36 and 37 are covered with a resilient material such as the rubber sleeve indicated at 42 in Figure 6. This is of course, the same as in the preferred form of the invention.

It is believed that the nature and advantages of my invention will be apparent from the foregoing description. Having thus described my invention, I claim:

1. A dish and means to attach it to a tray such as a high chair tray comprising oppositely directed hooks projecting from the peripheral edge of the dish above the bottom thereof whereby the edge may rest flatly on the tray, at least one hook having a shank portion slidably mounted in the dish, said dish having a recess extending inward from said peripheral edge receiving part of said shank, a screw plug threaded into the open end of said recess providing a bearing for said shank portion, and a spring in said recess having one end secured to the inner end of the shank portion and the other end bearing against the plug, said spring being coiled about the shank portion and opposing movement of the hook away from the dish.

2. A dish and means to attach it to a tray such as a high chair tray comprising oppositely directed hooks projecting from the peripheral edge of the dish above the bottom thereof whereby the edge may rest flatly on the tray, the hook means extending in one direction being yieldably secured in the dish to oppose movement thereof away from the dish, the dish having a recess extending inwardly from the periphery thereof and the hook means having the shank portion in said recess, a plug removably mounted in the outer end of said recess and a spring under compression bearing against the plug and against the inner end of the shank portion for yieldingly securing the hook means.

References Cited in the file of this patent
UNITED STATES PATENTS

| | | |
|---|---|---|
| 402,788 | Wagandt | May 7, 1889 |
| 698,077 | Sweet | Apr. 22, 1902 |
| 795,181 | Williams | July 18, 1905 |
| 1,350,223 | Hamilton | Aug. 17, 1920 |
| 1,980,575 | Covert | Nov. 13, 1934 |
| 2,526,820 | Holmes | Oct. 24, 1950 |
| 2,535,563 | Boyer et al. | Dec. 26, 1950 |